United States Patent
Hamajima et al.

(10) Patent No.: US 7,384,460 B2
(45) Date of Patent: Jun. 10, 2008

(54) WATER-BASED INK SET FOR INK-JET RECORDING AND INK-JET RECORDING METHOD

(75) Inventors: Tomoyo Hamajima, Nagoya (JP); Masaya Fujioka, Nagoya (JP); Ryuji Kato, Aisai (JP); Noriatsu Aoi, Ichinomiya (JP); Narumi Koga, Nagoya (JP); Narumi Kawai, Nagoya (JP); Shunichi Higashiyama, Yotsukaichi (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 128 days.

(21) Appl. No.: 11/312,870

(22) Filed: Dec. 19, 2005

(65) Prior Publication Data

US 2006/0132810 A1 Jun. 22, 2006

(30) Foreign Application Priority Data

Dec. 21, 2004 (JP) ............................. 2004-370286

(51) Int. Cl.
*C09D 11/00* (2006.01)
*C09D 11/02* (2006.01)
*B41J 2/01* (2006.01)

(52) U.S. Cl. ................... 106/31.27; 106/31.6; 347/100
(58) Field of Classification Search ............. 106/31.27, 106/31.6; 347/100
See application file for complete search history.

(56) References Cited

U.S. PATENT DOCUMENTS

| | | | |
|---|---|---|---|
| 6,299,287 B1 | 10/2001 | Williams et al. | |
| 6,843,840 B2 * | 1/2005 | Kataoka et al. | 106/31.6 |
| 7,223,300 B2 * | 5/2007 | Chevli | 106/31.27 |
| 2003/0169321 A1 | 9/2003 | Kushner et al. | |
| 2005/0235867 A1 * | 10/2005 | Jackson et al. | 106/31.27 |
| 2005/0284329 A1 * | 12/2005 | Jackson et al. | 106/31.6 |
| 2006/0119681 A1 * | 6/2006 | Sugimoto et al. | 347/100 |
| 2006/0132567 A1 * | 6/2006 | Kawai et al. | 347/100 |
| 2006/0238589 A1 * | 10/2006 | Koga et al. | 347/100 |
| 2007/0046749 A1 * | 3/2007 | Kawai et al. | 347/100 |
| 2007/0046750 A1 * | 3/2007 | Kawai et al. | 347/100 |
| 2007/0046751 A1 * | 3/2007 | Hamajima et al. | 347/100 |
| 2007/0046752 A1 * | 3/2007 | Hamajima et al. | 347/100 |
| 2007/0101900 A1 * | 5/2007 | Wheeler et al. | 106/31.27 |
| 2007/0107626 A1 * | 5/2007 | Chevli | 106/31.27 |

FOREIGN PATENT DOCUMENTS

| | | |
|---|---|---|
| EP | 1 507 405 | 2/2005 |
| JP | 1095093 | 4/1989 |
| JP | 2127482 | 5/1990 |

* cited by examiner

*Primary Examiner*—Helene Klemanski
(74) *Attorney, Agent, or Firm*—Reed Smith LLP

(57) ABSTRACT

A water-based ink set for ink-jet recording is provided. According to this ink set, graininess in a low density printed part can be reduced without reducing a color reproduction range in red and magenta directions in a high density printed part. In addition, the color reproduction range in the red direction can be extended to improve the vividness of red color. The water-based ink set for ink-jet recording includes a magenta ink and a red ink. The magenta ink is a light magenta ink having a lightness (L*) of about 50 or more in the L*a*b* colorimetric system. Preferably, the ink set further includes a light cyan ink having a lightness (L*) of about 60 or more and a blue ink and/or a green ink.

27 Claims, 3 Drawing Sheets

L*=40

——— : Example 6
······· : Comparative Example 3

L*=40

——— : Example 6

········ : Comparative Example 3

L*=50

——— : Example 6

········ : Comparative Example 3

WATER-BASED INK SET FOR INK-JET RECORDING AND INK-JET RECORDING METHOD

BACKGROUND OF THE INVENTION

1. Field of the Invention

The present invention relates to a water-based ink set for ink-jet recording suitable for reducing graininess in a low density printed part and for extending a color reproduction range. The present invention also relates to an ink-jet recording method using this water-based ink set for ink-jet recording.

2. Description of the Related Art

When a color image is expressed by an ink-jet recording method, a three color ink set has been generally used, composed of a yellow ink (Y), a magenta ink (M) and a cyan ink (C). Moreover, a four-color ink set has also been used in which a black ink (K) is further added to the standard three-color ink set.

Generally, in an ink-jet recording method, the gradation of an image is controlled by adjusting the density of dots formed by ejecting ink onto a recording material. However, when the gradation is controlled by such a method, the dot density decreases in a low density printed part. Relative to this, the individual dots become easily discernable to the eye, thereby causing the image to be grainy.

In view of the above, a method has been proposed in which two or more inks are employed as a cyan ink (Japanese Patent Application Laid-Open No. Hei 1-95093). In this method, these inks have different dye concentrations and are composed of different kinds of dyes. In addition, a dye which is excellent in vividness but inferior in light fastness is employed as a dark color ink, and a dye which is excellent in light fastness but inferior in vividness is employed as a light color ink. Moreover, a similar method has been proposed for a magenta ink (Japanese Patent Application Laid-Open No. Hei 2-127482). However, according to these methods, graininess can be improved, but a color reproduction range cannot be extended.

Generally, in a three-color ink set composed of yellow, magenta and cyan inks, and also in a four-color ink set in which a black ink is added to the three-color ink set, red color is expressed by use of the magenta ink and the yellow ink. When these two inks are used to express red color as above, sharp printing quality and good color developing properties are difficult to achieve due to a landing error of superposition. This is also the case when blue color is expressed by use of the magenta ink and the cyan ink and when green color is expressed by use of the cyan ink and the yellow ink.

SUMMARY OF THE INVENTION

The present invention has been made to solve the above-mentioned problems. Objects of the present invention are, in an ink-jet recording method:

(i) to reduce graininess in a low density printed part containing magenta color without reducing a color reproduction range in red and magenta directions in a high density printed part and with minimizing the number of inks composing an ink set;

(ii) to extend the color reproduction range in the red direction to improve vividness;

(iii) in accordance with need, to reduce graininess in a low density printed part containing cyan color without reducing the color reproduction range in blue, green and cyan directions in a high density printed part and with minimizing the number of inks composing the ink set; and (iv) to extend the color reproduction range in the blue and green directions.

The present inventors have conducted extensive studies on a water-based ink set for ink-jet recording. The studies are based on the hypothesis that the lightness (L*), the hue angle (h) and the chroma (C*) of the inks constituting the ink set are closely related to reducing graininess in a low density printed part of a color image and to extending the color reproduction range. Here, the lightness (L*), the hue angle (h) and the chroma (C*) are based on L*a*b* colorimetric system. Consequently, the present inventors have found that, in a water-based ink set for ink-jet recording having a magenta ink, the abovementioned objects (i) and (ii) can be achieved by employing a light magenta ink as the magenta ink and also employing a red ink. This light magenta ink has a lightness (L*) of a specific value or more and is employed in place of a normal magenta ink employed in a conventional ink set. The present inventors have also found that the abovementioned objects (iii) and (iv) can be achieved by employing a light cyan ink as a cyan ink and also employing a blue ink and/or a green ink. This light cyan ink has a lightness (L*) of a specific value or more and is employed in place of a normal cyan ink employed in a conventional ink set. Thus, the present invention has been completed.

Accordingly, the present invention provides a water-based ink set for ink-jet recording having a magenta ink and a red ink. The ink set is characterized in that the magenta ink is a light magenta ink having a lightness (L*) of about 50 or more in the L*a*b* colorimetric system.

In one aspect, the ink set has a cyan ink which is a light cyan ink having a lightness (L*) of about 60 or more in the L*a*b* colorimetric system and further has a blue ink and/or a green ink.

In addition, the present invention provides an ink-jet recording method employing the above-mentioned water-based ink set for ink-jet recording.

The water-based ink set for ink-jet recording of the present invention comprises a light magenta ink having a low coloring agent concentration as a magenta ink. Therefore, when ink-jet recording is performed using this ink set, graininess can be reduced in a low density printed part containing magenta color. Further, the ink set of the present invention comprises a red ink in addition to the light magenta ink. Therefore, a color reproduction range in a magenta direction is not reduced in a high density printed part, and the color reproduction range in a red direction is significantly extended, and the vividness of red color is improved. The improvement of the vividness of red color is achieved since red color is not expressed by color mixing of a magenta ink and a yellow ink but can be expressed by the red ink alone. Further, according to the ink set of the present invention, the following effects can be achieved by use of two inks, i.e., the light magenta ink and the red ink: the reduction of graininess in a low density printed part containing magenta color; the prevention of the reduction of the color reproduction range of magenta color in a high density printed part; the significant extension of the color reproduction range in the red direction; and the improvement of the vividness of red color.

The ink set of the present invention in one aspect comprises a light cyan ink and a blue ink and/or a green ink in addition to the abovementioned light magenta and red inks.

In this aspect, graininess can be reduced in a low density printed part containing cyan color by use of the light cyan ink. In the aspect in which the light cyan ink and the blue ink are provided, the color reproduction range in a cyan direction is not reduced in a high density printed part. In this case, the color reproduction range in a blue direction is significantly extended, thereby improving the vividness of the blue color printed by use of the blue ink alone. Also, in the aspect in which the light cyan ink and the green ink are provided, the color reproduction range in the cyan direction is not reduced in a high density printed part. In this case, the color reproduction range in a green direction is significantly extended, and the vividness of the green color printed by use of the green ink alone is improved.

Therefore, according to the ink set of the present invention, the color reproducibility and the print quality of a color image formed by an ink-jet recording method can be improved. Generally, red color is the second most frequently used color in text printing next to black color. According to the present invention, the text in red color is not printed by superposing two inks but can be printed by use of the red ink alone. Therefore, sharp print quality can be achieved in which feathering is suppressed, and good color developing properties can also be obtained. Further, in the aspect in which the blue ink or the green ink is provided in accordance with need, sharp print quality can be achieved in the text printed in blue or green color, and good color developing properties can also be obtained for these colors.

DETAILED DESCRIPTION OF THE INVENTION

Figure 1:
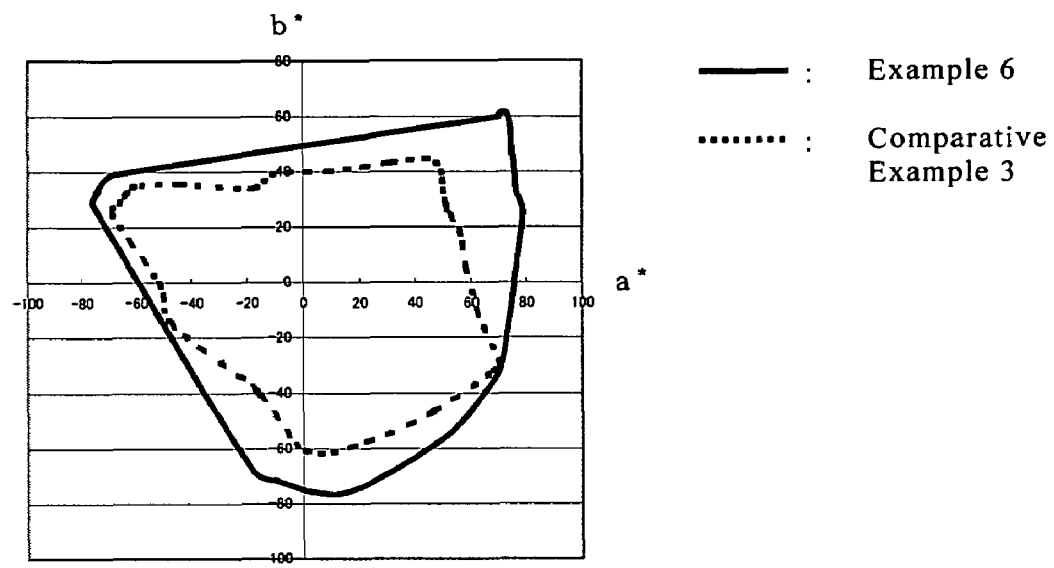
FIG. 1 is a graph showing a color reproduction range at lightness L*=40 for Example 6 and Comparative Example 3.

The present invention will now be described in detail.

In the present invention, lightness (L*), hue angle (h) and chroma (C*) are based on the L*a*b* colorimetric system standardized by the Commission Internationale de l'Eclairage (CIE) in 1976. This colorimetric system is also defined in Japanese Industrial Standards (JIS Z 8729).

In the present invention, the lightness (L*) is a lightness value in an object solidly printed at a resolution of 1,200×1,200 dpi with an ink on glossy paper and is obtained by means of a spectrocolorimeter or a similar apparatus. Also, with respect to the hue angle (h) and the chroma (C*), in the same solidly printed object, first, color indices (a* and b*) are obtained by means of a spectrocolorimeter or a similar apparatus, and the hue angle (h) and the chroma (C*) are calculated from the following equations (1) and (2) using the obtained a* and b*.

$$C^* = \sqrt{(a^*)^2 + (b^*)^2} \quad \text{Equation (1)}$$

$$h = \tan^{-1}\left(\frac{b^*}{a^*}\right) \quad \text{(when } a^* \geq 0 \text{ and } b^* \geq 0\text{)} \quad \text{Equation (2)}$$

$$h = 360 + \tan^{-1}\left(\frac{b^*}{a^*}\right) \quad \text{(when } a^* \geq 0 \text{ and } b^* < 0\text{)}$$

$$h = 180 + \tan^{-1}\left(\frac{b^*}{a^*}\right) \quad \text{(when } a^* < 0\text{)}$$

The term of "glossy paper" employed in the measurement of the L*, a* and b* values refers to paper having a coat layer for surface smoothness provided on base paper (body paper). Specific examples of the glossy paper include KASSAI (a registered trade mark) glossy finishing (product of FUJI Photo Film Co., Ltd.), ink-jet printer paper (glossy paper, product of KOKUYO Co., Ltd.), thick glossy paper (product of Kodak Co., Ltd.) and the like. The term of "object solidly printed at a resolution of 1,200×1,200 dpi" refers to an area which is printed at a resolution of 1,200×1,200 dpi so as to be fully covered with ink. An ink-jet printer is employed for printing, and examples of the ink-jet printer include a digital multifunction device equipped with an ink-jet printer (MFC-5200J, product of Brother Industries, Ltd.) and the like. Examples of the spectrocolorimeter which can be used include Spectrolino (product of Gretag Macbeth) and the like. The measurement is performed by use of a light source $D_{65}$ at a viewing angle of 2°.

The water-based ink set for ink-jet recording of the present invention comprises at least a magenta ink and a red ink and is characterized in that the magenta ink is a light magenta ink having a lightness L* of about 50 or more. Therefore, a normal magenta ink having a lightness L* of less than about 50 is not included in the ink set of the present invention. If this normal magenta ink having a lightness L* of less than about 50 is employed as the magenta ink, graininess is noticeable in a low density printed part containing magenta color. Thus, this normal magenta ink is not preferable as the magenta ink.

Preferably, the light magenta ink constituting the ink set of the present invention has a lightness L* in the range of from about 50 to about 65. The light magenta ink having a lightness L* exceeding about 65 is not preferable since, in this case, the original magenta color is difficult to reproduce.

Preferably, the hue angle h of the light magenta ink is adjusted within the range of from about 335° to about 360° or the range of from about 0° to about 5°. If the hue angle h is not in either of the above ranges, magenta color is not satisfactorily expressed.

Further, preferably, the chroma C* of the light magenta ink is adjusted within the range of from about 80 to about 90. By adjusting the chroma C* within the above range, magenta color can be reproduced vividly.

Preferably, the red ink constituting the ink set of the present invention has a lightness L* of about 50 or less. If the lightness L* of the red ink exceeds about 50, the obtained color reproducibility range is not satisfactory in a red direction. More preferably, the lightness L* of the red ink falls within the range of from about 25 to about 50. By adjusting the lightness L* of the red ink within the above range, red and magenta colors can be reproduced at a satisfactory density.

Preferably, the hue angle h of the red ink is adjusted within the range of from about 20° to about 35°. If the hue angle h is adjusted within the range, red color is satisfactorily expressed.

Further, preferably, the chroma C* of the red ink is adjusted within the range of from about 80 to about 90. By adjusting the chroma C* within the above range, red color can be reproduced vividly.

The ink set of the present invention may include any ink in addition to the above-described light magenta and red inks. For example, a yellow ink and/or a cyan ink may be included in the ink set, and a black ink may be included in accordance with need. A full color image can be reproduced by including a yellow ink, a cyan ink, and, if necessary, a black ink in addition to the above-described light magenta and red inks.

If a cyan ink is included in the ink set of the present invention, preferably, a light cyan ink having a lightness L* of about 60 or more is employed as the cyan ink, and a blue ink and/or a green ink is also employed. In this case, a normal cyan ink having a lightness L* of less than about 60 is unnecessary. By employing the light cyan ink having a lightness L* of about 60 or more in place of the normal cyan ink, graininess can be reduced in a low density printed part containing cyan color. Preferably, the lightness L* of the light cyan ink falls within the range of from about 60 to about 85. The light cyan ink having a lightness L* exceeding about 85 is not preferable since, in this case, the original cyan color is difficult to reproduce.

Preferably, the hue angle h of the light cyan ink is adjusted within the range of from about 215° to about 255°. If the hue angle h is not in the range, cyan color is not satisfactorily expressed.

Further, preferably, the chroma C* of the light cyan ink is adjusted within the range of from about 40 to about 70. By adjusting the chroma C* within the above range, cyan color can be reproduced vividly.

Preferably, the blue ink constituting the ink set of the present invention together with the above-mentioned light cyan ink has a lightness L* of about 45 or less. If the lightness L* of the blue ink exceeds about 45, it is difficult to reproduce the original blue color. More preferably, the lightness L* of the blue ink falls within the range of from about 35 to about 45. By adjusting the lightness L* of the blue ink within the above range, blue and cyan colors can be reproduced at a satisfactory density.

Preferably, the hue angle h of the blue ink is adjusted within the range of from about 270° to about 285°. If the hue angle h is adjusted within the range, blue color is satisfactorily expressed.

Further, preferably, the chroma C* of the blue ink is adjusted within the range of from about 70 to about 80. By adjusting the chroma C* within the above range, blue color can be reproduced vividly.

The green ink constituting the ink set together with the above-described light cyan ink preferably has a lightness L* of about 60 or less. The green ink having a lightness L* exceeding about 60 is not preferable since, in this case, the original green color is difficult to reproduce. More preferably, the lightness L* of the green ink falls within the range of from about 35 to about 60. By adjusting the lightness L* of the green ink within the above range, green and cyan colors can be reproduced at a satisfactory density.

Preferably, the hue angle h of the green ink is adjusted within the range of from about 175° to less than about 215°. If the hue angle h is adjusted within the range, green color is satisfactorily expressed.

Further, preferably, the chroma C* of the green ink is adjusted within the range of from about 60 to about 80. By adjusting the chroma C* within the above range, green color can be reproduced vividly.

If a yellow ink or a black ink is included in the ink set of the present invention, an ink employed in a publicly known ink set may be employed as these inks. For example, a normal yellow ink having a hue angle h of from about 70° to about 140° may be employed as the yellow ink.

Each of the inks constituting the ink set of the present invention contains a coloring agent, water and a water soluble organic solvent so as to have L*, h, and C* of the respective predetermined values described above.

Water soluble dye and/or pigment may be employed as the coloring agent contained in each of the inks. A proper combination of water soluble dye and pigment may be employed to adjust the inks to have the predetermined color.

Representative examples of the water soluble dye employed include direct dyes, acid dyes, basic dyes, reactive dyes and the like. Also, examples of the preferable water soluble dye include azo dyes, metal complex dyes, naphthol dyes, anthraquinone dyes, indigo dyes, carbonium dyes, quinoneimine dyes, xanthene dyes, aniline dyes, quinoline dyes, nitro dyes, nitroso dyes, benzoquinone dyes, naphthoquinone dyes, phthalocyanine dyes, metal phthalocyanine dyes and the like. Particularly, examples of the water soluble dye which is suitable as the ink of an ink-jet recording method and satisfies the required properties such as sharpness, water solubility, stability and light fastness include: direct dyes such as C. I. Direct Yellows 12, 24, 26, 27, 28, 33, 39, 58, 86, 98, 100, 132 and 142, C. I. Direct Reds 4, 17, 28, 37, 63, 75, 79, 80, 81, 83 and 254, C. I. Direct Violets 47, 48, 51, 90 and 94, C. I. Direct Blues 1, 6, 8, 15, 22, 25, 71, 76, 80, 86, 87, 90, 106, 108, 123, 163, 165, 199 and 226, C. I. Direct Greens 1, 26, 28, 59, 80 and 85, and the like; acid dyes such as C. I. Acid Yellows 3, 11, 17, 19, 23, 25, 29, 38, 42, 49, 59, 61, 71 and 72, C. I. Acid Reds 1, 6, 8, 18, 32, 35, 37, 42, 52, 85, 88, 115, 133, 134, 154, 186, 249, 289 and 407, C. I. Acid Violets 10, 34, 49 and 75, C. I. Acid Blues 9, 22, 29, 40, 59, 62, 93, 102, 104, 112, 113, 117, 120, 167, 175, 183, 229 and 234, C. I. Acid Greens 3, 5, 9, 12, 15, 16, 19, 25, 27, 28, 36, 40, 41, 43, 44, 56, 73, 81, 84, 104, 108 and 109, and the like; basic dyes such as C. I. Basic Yellow 40, C. I. Basic Reds 9, 12 and 13, C. I. Basic Violets 7, 14 and 27, C. I. Basic Blues 1, 3, 5, 7, 9, 24, 25, 26, 28 and 29, C. I. Basic Greens 1 and 4, and the like; and reactive dyes such as C. I. Reactive Yellow 2, C. I. Reactive Reds 4, 23, 24, 31 and 56, C. I. Reactive Blues 7, 13 and 49, C. I. Reactive Greens 5, 6, 7, 8, 12, 15, 19 and 21, and the like.

In addition, examples of the pigment include C. I. Pigment Yellows 1, 2, 3, 13, 16, 74, 83, 93, 128, 134 and 144, C. I. Pigment Reds 5, 7, 12, 23, 48 (Mn), 57 (Ca), 112, 122, 144, 170, 177, 221, 254 and 264, C. I. Pigment Violets 19 and 48 (Ca), C. I. Pigment Blues 1, 2, 3, 15, 15:1, 15:2, 15:3, 15:4, 15:5, 15:6, 16, 17:1, 22, 27, 28, 29, 36 and 60, C. I. Pigment Green 7, and the like.

Water soluble dye and/or pigment may be employed as the coloring agent of the black ink, and a proper combination thereof may also be employed. Examples of the water soluble dye include: direct dyes such as C. I. Direct Blacks 17, 19, 32, 51, 71, 108, 146, 154 and 168, and the like; acid dyes such as C. I. Acid Blacks 2, 7, 24, 26, 31, 52, 63, 112 and 118, and the like; basic dyes such as C. I. Basic Black 2, and the like; and C. I. food blacks 1 and 2, and the like. Examples of the pigment which can be employed include carbon blacks such as MA8, MA100 (products of Mitsubishi Chemical Corporation), and color black FW200 (product of Degussa). A self-dispersing type carbon black which can disperse in water without using a dispersing agent may be employed as the carbon black. A self-dispersing type carbon black can be obtained by subjecting a carbon black to a surface treatment such that at least one hydrophilic group such as a carbonyl group, a carboxyl group, a hydroxyl group, a sulfone group or a salt thereof is bound to the surface of the carbon black. Specific examples of the surface treatment include a method disclosed in Japanese Patent Application Laid-Open No. Hei8-3498 (corresponding to U.S. Pat. No. 5,609,671) and a method disclosed in Published Japanese translation of PCT international application No. 2000-513396 (corresponding to WO97/48769). Alternatively, a commercial product such as CAB-O-JET (a registered trade mark) 200, 300 (products of Cabot Corporation) or BONJET (a registered trade mark) CW1 (product of Orient Chemical Industries, Ltd.) may be employed as the self-dispersing black pigment.

The preferable content of the water soluble dye contained in each of the inks depends on the desired printing density and the desired color. If the content is too low, the color is not satisfactorily developed on a recording material. If the content is too high, a nozzle of an ink-jet head tends to be clogged. Thus, the content of the water soluble dye with respect to the total amount of the corresponding ink is preferably about 0.1 to about 15 wt. %, more preferably about 0.3 to about 10 wt. % and particularly preferably about 0.5 to about 5.0 wt. %.

The preferable content of the pigment contained in each of the inks depends on the desired printing density and the desired color. If the content is too low, the color is not satisfactorily developed on a recording material. If the content is too high, a nozzle of an ink-jet head tends to be clogged. Thus, the content of the pigment with respect to the total amount of the corresponding ink is preferably about 1 to about 15 wt. % and more preferably about 1 to about 10 wt. %.

Preferably, the water employed in each of the inks is deionized water. The content of the water is determined based on the kind of the water soluble organic solvent, the composition of the ink and the desired ink properties. If the content of the water is too low, the viscosity of the ink increases to cause difficulty in ejecting the ink from a nozzle of an ink-jet head. If the content is too high, the coloring agent is precipitated or aggregated due to the evaporation of water, and thus a nozzle of an ink-jet head tends to be clogged. Therefore, the content of the water with respect to the total amount of the corresponding ink is preferably about 10 to about 95 wt. %, more preferably about 10 to about 70 wt. % and particularly preferably about 20 to about 70 wt. %.

The water soluble organic solvents employed in each of the inks are broadly categorized into a humectant and a penetrant.

The humectant is added to the ink for preventing clogging of a nozzle of an ink-jet head. Specific examples of the humectant include water soluble glycols such as glycerin, ethylene glycol, diethylene glycol, triethylene glycol, polyethylene glycol, propylene glycol, dipropylene glycol, tripropylene glycol, polypropylene glycol 1,5-pentanediol, 1,6-hexanediol and the like. If the content of the water soluble organic solvent serving as the humectant is too low, the clogging of a nozzle of an ink-jet head is not satisfactorily prevented. If the content is too high, the viscosity of the ink increases to cause difficulty in ejecting. Therefore, the content of the water soluble organic solvent with respect to the total amount of the corresponding ink is preferably about 5 to about 50 wt. %, more preferably about 5 to about 40 wt. % and particularly preferably about 5 to about 35 wt. %.

The penetrant is added to the ink for allowing the ink to rapidly penetrate into recording paper upon printing. Specific examples of the penetrant include glycol ethers typified by ethylene glycol-based and propylene glycol-based alkyl ethers. Specific examples of the ethylene glycol-based alkyl ether include ethylene glycol methyl ether, ethylene glycol-n-ethyl ether, ethylene glycol-n-propyl ether, ethylene glycol-n-butyl ether, ethylene glycol isobutyl ether, diethylene glycol methyl ether, diethylene glycol-n-ethyl ether, diethylene glycol-n-propyl ether, diethylene glycol-n-butyl ether, diethylene glycol isobutyl ether, triethylene glycol methyl ether, triethylene glycol-n-ethyl ether, triethylene glycol-n-propyl ether, triethylene glycol-n-butyl ether, triethylene glycol isobutyl ether and the like.

Specific examples of the propylene glycol-based alkyl ether include propylene glycol methyl ether, propylene glycol-n-ethyl ether, propylene glycol-n-propyl ether, propylene glycol-n-butyl ether, dipropylene glycol methyl ether, dipropylene glycol-n-ethyl ether, dipropylene glycol-n-propyl ether, dipropylene glycol-n-butyl ether, tripropylene glycol methyl ether, tripropylene glycol-n-ethyl ether, tripropylene glycol-n-propyl ether, tripropylene glycol-n-butyl ether and the like.

If the content of the water soluble organic solvent serving as the penetrant is too low, the penetrability is unsatisfactory. If the content is too high, the penetrability becomes excessively high, and thus bleeding such as feathering tends to occur. Therefore, the content of the water soluble organic solvent with respect to the total amount of the corresponding ink is preferably about 0.1 to about 10 wt. % and more preferably about 0.1 to about 5 wt. %.

Each of the inks constituting the ink set of the present invention may contain a water soluble organic solvent in addition to the above-described humectant and penetrant. The water soluble organic solvent prevents drying of ink at the tip of an ink-jet head, enhances printing density and helps the development of vivid color. Examples of such water soluble organic solvent include: lower alcohols such as methyl alcohol, ethyl alcohol, n-propyl alcohol, isopropyl alcohol, n-butyl alcohol, sec-butyl alcohol, tert-butyl alcohol and the like; amides such as dimethylformamide, dimethylacetamide and the like; ketones and keto-alcohols such as acetone, diacetone alcohol and the like; ethers such as tetrahydrofuran, dioxane and the like; glycerin; 2-pyrrolidone; N-methyl-2-pyrrolidone; and 1,3-dimethyl-2-imidazolidinone.

Moreover, other conventionally known surfactants; viscosity modifiers such as polyvinyl alcohol, cellulose, water soluble resin and the like; surface tension modifiers, mildewproofing agents; or the like may be added to each of the inks constituting the ink set of the present invention in accordance with need.

The ink-jet recording method of the present invention performs ink-jet recording by use of the ink set of the present invention. No particular limitation is imposed on the type of the ink-jet recording method. Examples of the ink-jet recording method include an electrostatic suction method, a method using a piezoelectric element, a thermal method and the like.

EXAMPLES

The present invention will next be specifically described by way of Examples and Comparative Examples.

Examples 1 to 5, Comparative Examples 1 and 2

(1) Preparation of Inks

Light magenta ink 1 having the ink composition shown in Table 1 was prepared as follows.

First, 69.4 parts by weight of water, 27 parts by weight of glycerin and 2 parts by weight of dipropylene glycol-n-propyl ether were mixed to prepare 98.4 parts by weight of an ink solvent. Subsequently, 1.6 parts by weight of a magenta water soluble dye (C. I. Acid Red 52) was added to 98.4 parts by weight of the ink solvent under stirring. The mixture was continued to stir for 30 minutes and filtrated with a membrane filter having a pore size of 1 μm to obtain light magenta ink 1.

The same procedure as in the case of light magenta ink 1 was repeated to prepare light magenta inks 2 and 3, a normal magenta ink, red inks 1 to 3 and a yellow ink, except that the ink composition thereof was changed as shown in Table 1.

(2) Determination of L*, a*, b*, C* and h

Each of the inks was filled into a predetermined ink cartridge, and the ink cartridge was attached to a digital multifunction device equipped with an ink-jet printer (MFC-5200J, product of Brother Industries, Ltd.). Subsequently, an object was solidly printed at a resolution of 1,200×1,200 dpi on glossy paper (KASSAI (a registered trade mark) glossy finishing, product of FUJI Photo Film Co., Ltd.). The solidly printed object was measured for L*, a* and b* by means of Spectrolino (product of Gretag Macbeth) (light source: $D_{65}$, viewing angle: 2°).

The values of C* and h were evaluated from the following equations (1) and (2) using the obtained measurement values.

The results are shown in Table 1.

$$C^* = \sqrt{(a^*)^2 + (b^*)^2} \quad \text{Equation (1)}$$

$$h = \tan^{-1}\left(\frac{b^*}{a^*}\right) \quad \text{(when } a^* \geq 0 \text{ and } b^* \geq 0\text{)} \quad \text{Equation (2)}$$

$$h = 360 + \tan^{-1}\left(\frac{b^*}{a^*}\right) \quad \text{(when } a^* \geq 0 \text{ and } b^* < 0\text{)}$$

$$h = 180 + \tan^{-1}\left(\frac{b^*}{a^*}\right) \quad \text{(when } a^* < 0\text{)}$$

TABLE 1

| | | Light magenta ink 1 | Light magenta ink 2 | Light magenta ink 3 | Normal magenta ink | Red ink 1 | Red ink 2 | Red ink 3 | Yellow ink |
|---|---|---|---|---|---|---|---|---|---|
| Ink composition (wt %) | C. I. Acid Red 52 | 1.6 | 1.3 | 0.6 | 2.5 | — | — | — | — |
| | C. I. Direct Red 254 | — | — | — | — | 2.5 | — | — | — |
| | C. I. Direct Red 81 | — | — | — | — | — | 2.5 | — | — |
| | C. I. Acid Red 88 | — | — | — | — | — | — | 2.5 | — |
| | C. I. Direct Yellow 86 | — | — | — | — | — | — | — | 0.4 |
| | C. I. Direct Yellow 132 | — | — | — | — | — | — | — | 1.6 |
| | Glycerin | 27.0 | 27.0 | 27.0 | 27.0 | 27.0 | 27.0 | 27.0 | 27.0 |
| | Dipropylene glycol-n-propyl ether | 2.0 | 2.0 | 2.0 | 2.0 | 2.0 | 2.0 | 2.0 | 2.0 |
| | Water | 69.4 | 69.7 | 70.4 | 68.5 | 68.5 | 68.5 | 68.5 | 69.0 |
| Colorimetric system | L* | 51 | 54 | 65 | 49 | 32 | 41 | 57 | — |
| | a* | 84 | 82 | 67 | 85 | 67 | 75 | 69 | — |
| | b* | −7 | −13 | −23 | −1 | 43 | 47 | 34 | — |
| | C* | 84 | 83 | 71 | 85 | 80 | 89 | 77 | — |
| | h[°] | 355 | 351 | 341 | 359 | 33 | 32 | 26 | — |

(3) Configuration of Ink Sets

The inks shown in Table 1 were combined as shown in Table 2 to configure water-based ink sets for ink-jet recording. Comparative Example 1 corresponds to a conventional ink set.

(4) Evaluation of Ink Sets

For each of the ink sets shown in Table 2, the inks constituting the ink set were filled into predetermined ink cartridges, and the ink cartridges were attached to a digital multifunction device equipped with an ink-jet printer (MFC-5200J, product of Brother Industries, Ltd.). Subsequently, gradation samples for the light magenta ink and the normal magenta ink were printed for graininess evaluation on glossy paper (KASSAI (a registered trade mark) glossy finishing, product of FUJI Photo Film Co., Ltd.). In addition, print pattern samples containing patches having various hues were printed by changing the mixing ratio of the yellow ink, the magenta ink (the light magenta ink or the normal magenta ink) and the red ink for color reproducibility evaluation of red and magenta colors.

The patches of each of the printed samples were measured for a*, b* and L* by means of the same method as above. Subsequently, (a) graininess evaluation of magenta color, (b) evaluation of red color reproducibility, (c) evaluation of magenta color reproducibility and (d) overall evaluation were performed as follows.

(a) Graininess Evaluation of Magenta Color

For each of the gradation samples, the patch for L*=90 was visually observed, and the graininess of magenta color was evaluated by the following criteria. The evaluation results are shown in Table 2.
 A: Graininess is not found.
 B: Graininess is almost unnoticeable.
 C: Graininess is noticeable. Practically problematic.

(b) Evaluation of Red Color Reproducibility (b-1) Visual Evaluation

Patches having a hue angle (h) of 33°±5° were selected from the abovementioned print pattern samples. Here, the above hue angle (h) corresponds to red color. The selected red color patches were visually observed to evaluate, according to the following criteria, whether or not the red color was satisfactorily expressed. The evaluation results are shown in Table 2.
 A: High density red color is satisfactorily expressed.
 B: High density red color is expressed.
 C: High density red color is not satisfactorily expressed.

(b-2) Chroma (C*) and Chroma Difference (A)

Red color patches having a hue angle (h) of 33°±5° and lightnesses L* of 40±2, 50±2 and 65±2 were selected from the abovementioned print pattern samples, and C* was calculated for each of the selected patches from equation (1).

In addition, chroma difference (A) was calculated from equation (3) below as a comparison criterion. The chroma difference (A) is the difference between the chroma value $C^*(C^*_2)$ of each of the above patches and the chroma value $C^*(C^*_1)$ of the patch (h=33°) of Comparative Example 1 for each of the corresponding L* values. The larger the chroma difference (A), the better the color reproducibility of high density red color. The results are shown in Table 2.

$$A = C^*_2 - C^*_1 \quad \text{Equation (3)}$$

(wherein $C^*_1$ is C* of comparative example 1 (h=33°), and $C^*_2$ is C* of example or comparative example (h=33°±5°))

(c) Evaluation of Magenta Color Reproducibility (c-1) Visual Evaluation

Patches having a hue angle (h) of 359°±5° were selected from the abovementioned print pattern samples. Here, the above hue angle (h) corresponds to magenta color. The selected magenta color patches were visually observed to evaluate, according to the following criteria, whether or not the magenta color was satisfactorily expressed. The evaluation results are shown in Table 2.
 A: High density magenta color is satisfactorily expressed.
 B: Colors close to high density magenta color are expressed.
 C: High density magenta color is not satisfactorily expressed.

(c-2) Chroma (C*) and Color Difference (ΔE)

A patch having a hue angle (h) of 320° to 360° or 0° to 20° was selected from the above print pattern samples. When the hue angle (h) of a patch falls within the above range, the patch is categorized as a magenta color patch. The selection was made such that the selected patch had a lightness L* and a hue angle (h) closest to those of the magenta color patch of Comparative Example 1. This patch of Comparative Example 1 was printed by use of a conventional ink set and was an object solidly printed at a resolution of 1,200×1,200 dpi on glossy paper by use of the normal magenta ink alone (h=359°, L*=49). Subsequently, the color difference (ΔE) between the selected patch and the patch of Comparative Example 1 was evaluated from equation (4) to evaluate the reproducibility of high density magenta color by use of the following criteria. The color difference (ΔE) serves as a measure of how the color of the selected patch is different from the reference magenta color of Comparative Example 1. The smaller the color difference (ΔE) value, the closer the color of the selected patch is to the reference magenta color.

$$\Delta E = \sqrt{(\Delta L^*)^2 + (\Delta a^*)^2 + (\Delta b^*)^2}$$

$$\Delta L^* = L^*_2 - L^*_1$$

$$\Delta a^* = a^*_2 - a^*_1$$

$$\Delta b^* = b^*_2 - b^*_1 \quad \text{Equation (4)}$$

(wherein $L^*_1$ is L* of comparative example 1, $L^*_2$ is L* of example or comparative example, $a^*_1$ is a* of comparative example 1, $a^*_2$ is a* of example or comparative example, $b^*_1$ is b* of comparative example 1 and $b^*_2$ is b* of example or comparative example)

(d) Overall Evaluation

Overall evaluation was conducted based on the results of (a) graininess evaluation of magenta color, (b) evaluation of red color reproducibility and (c) evaluation of magenta color reproducibility by use of the following criteria. The results are shown in Table 2.
 G: All of the evaluation results are rank A or rank B.
 NG: The evaluation results contain rank C.

TABLE 2

|  |  | Example 1 | | | Example 2 | | | Example 3 | | | Example 4 | | |
|---|---|---|---|---|---|---|---|---|---|---|---|---|---|
| Ink | Magenta ink | Light magenta ink 1 | | | Light magenta ink 2 | | | Light magenta ink 1 | | | Light magenta ink 3 | | |
|  | Red ink | Red ink 1 | | | Red ink 1 | | | Red ink 2 | | | Red ink 1 | | |
|  | Yellow ink | Yellow ink | | | Yellow ink | | | Yellow ink | | | Yellow ink | | |
| E-valu-ation | Graininess of magenta color | B | | | B | | | B | | | A | | |
|  | Reproducibility of red color — Visual evaluation | A | | | A | | | A | | | A | | |
|  | L* | 40 ± 2 | 50 ± 2 | 65 ± 2 | 40 ± 2 | 50 ± 2 | 65 ± 2 | 40 ± 2 | 50 ± 2 | 65 ± 2 | 40 ± 2 | 50 ± 2 | 65 ± 2 |
|  | C* | 88 | 91 | 65 | 88 | 88 | 59 | 91 | 91 | 64 | 86 | 83 | 58 |

TABLE 2-continued

|  |  |  | | | | | | | | | | |
|---|---|---|---|---|---|---|---|---|---|---|---|---|
|  | Chroma difference (A) | *3 | | −1 | 4 | *3 | | −4 | −2 | *3 | −1 | 3 | *3 | −9 | −3 |
| Reproducibility of magenta color | Visual evaluation | A | | | A | | | A | | | B | |
|  | L* | 51 | | | 51 | | | 50 | | | 54 | |
|  | a* | 80 | | | 80 | | | 82 | | | 76 | |
|  | b* | 3 | | | 2 | | | 4 | | | 1 | |
|  | Color difference (ΔE) | 7 | | | 6 | | | 6 | | | 10 | |
| Overall evaluation |  | G | | | G | | | G | | | G | |

|  |  |  | Example 5 | | | Comparative Example 1 | | | Comparative Example 2 | | |
|---|---|---|---|---|---|---|---|---|---|---|---|
|  | Ink | Magenta ink | Light magenta ink 1 | | | Normal magenta ink | | | Light magenta ink 2 | | |
|  |  | Red ink | Red ink 3 | | | — | | | — | | |
|  |  | Yellow ink | Yellow ink | | | Yellow ink | | | Yellow ink | | |
| E-valu-ation | Graininess of magenta color | | B | | | C | | | B | | |
|  | Reproducibility of red color | Visual evaluation | B | | | B | | | C | | |
|  |  | L* | 40 ± 2 | 50 ± 2 | 65 ± 2 | 40 ± 2 | 50 ± 2 | 65 ± 2 | 40 ± 2 | 50 ± 2 | 65 ± 2 |
|  |  | C* | *1 | 93 | 69 | *1 | 92 | 61 | *1 | *2 | 58 |
|  |  | Chroma difference (A) | *3 | 1 | 8 | Comparison criterion | | | *3 | *3 | −3 |
|  | Reproducibility of magenta color | Visual evaluation | A | | | A | | | C | | |
|  |  | L* | 51 | | | 49 | | | 54 | | |
|  |  | a* | 84 | | | 85 | | | 77 | | |
|  |  | b* | 0 | | | −1 | | | 11 | | |
|  |  | Color difference (ΔE) | 2 | | | Comparison criterion | | | 15 | | |
| Overall evaluation |  | | G | | | NG | | | NG | | |

*1: Red color at L* = 40 cannot be expressed.
*2: Red color at L* = 50 cannot be expressed.
*3: Chroma difference (A) cannot be calculated.

As shown in Table 2, in each of Examples 1 to 3, the graininess was almost unnoticeable in a low density printed part (L*=90) of magenta color, since the light magenta ink having a lightness L* of 50 or more was employed. In addition, high density red color was satisfactorily expressed since the red ink having a lightness L* of 50 or less was employed. Moreover, although the low color density light magenta ink having a lightness L* of 50 or more was employed, the expressed high density magenta color was comparable to the magenta color expressed by the conventional ink set (Comparative Example 1) since the red ink was employed. Further, the high density red color having a lightness L* of 40±2 could be expressed, which could not be expressed by the conventional ink set (Comparative Example 1).

In Example 4, the graininess of magenta color was not found since the light magenta ink employed had a lightness L* still larger than that of the light magenta inks employed in Examples 1 to 3. Moreover, high density red color could be satisfactorily expressed, since the red ink having a lightness L* of 50 or less was employed. Further, although the light magenta ink employed had a lightness L* still larger than that of the magenta inks employed in Examples 1 to 3, colors close to high density magenta color could be satisfactorily expressed.

Also, in Example 5, the graininess of magenta color was almost unnoticeable since the light magenta ink employed had a lightness L* of 50 or more. Moreover, since the red ink was employed, the expressed high density magenta color was comparable to the magenta color expressed by the conventional ink set (Comparative Example 1). In addition, although the red ink employed had a lightness L* larger than that of the red inks employed in Examples 1 to 4, the expressed high density red color was comparable to the red color expressed by the conventional ink set (Comparative Example 1).

In Comparative Example 2, the graininess of magenta color was reduced as compared to the conventional ink set (Comparative Example 1) sine the light magenta ink employed had a large lightness L*. However, high density red color was highly unsatisfactorily expressed since the red ink was not employed. In addition, although the employed magenta ink had a large lightness L*, high density magenta color was unsatisfactorily expressed since the red ink was not employed. Thus, the ink set of Comparative Example 2 is practically problematic.

Example 6 and Comparative Example 3

(1) Preparation of Inks and Configuration of Ink Sets

The same procedure as in Example 1 was repeated to prepare a light cyan ink, a blue ink and a green ink. The composition of the each ink is shown in Table 3. The above-described yellow ink, light magenta ink 1 and red ink 1 were similarly prepared. The ink set of Example 6 was configured by use of these six inks.

A commercial ink set was employed as the ink set of Comparative Example 3. This commercial ink set is a three color ink set for a digital multifunction device equipped with an ink-jet printer (MFC-5200J, product of Brother Industries, Ltd.) and comprises a yellow ink (LC600Y), a magenta ink (LC600M) and a cyan ink (LC600C).

TABLE 3

|  |  | Yellow ink | Light magenta ink 1 | Red ink 1 | Light cyan ink | Blue ink | Green ink |
|---|---|---|---|---|---|---|---|
| Ink composition (wt %) | C. I. Acid Red 52 | — | 1.6 | — | — | — | — |
|  | C. I. Direct Red 254 | — | — | 2.5 | — | — | — |
|  | C. I. Direct Blue 199 | — | — | — | 2.0 | — | — |
|  | C. I. Acid Blue 112 | — | — | — | — | 6.0 | — |
|  | C. I. Direct Yellow 86 | 0.4 | — | — | — | — | — |
|  | C. I. Direct Yellow 132 | 1.6 | — | — | — | — | — |
|  | C. I. Acid Green 3 | — | — | — | — | — | 6.0 |
|  | Glycerin | 27.0 | 27.0 | 27.0 | 27.0 | 27.0 | 27.0 |
|  | Dipropylene glycol-n-propyl ether | 2.0 | 2.0 | 2.0 | 2.0 | 2.0 | 2.0 |
|  | Water | 69.0 | 69.4 | 68.5 | 69.0 | 65.0 | 65.0 |
| Colorimetric system | L* | — | 51 | 32 | 60 | 42 | 49 |
|  | C* | — | 84 | 80 | 68 | 74 | 77 |
|  | h[°] | — | 355 | 33 | 230 | 272 | 189 |

(2) Determination of L*, C* and h

Each of the inks was measured for L*, a* and b* similarly to Example 1, and C* and h were calculated. The results are shown in Table 3.

(3) Evaluation of Ink Sets

As in the evaluation of ink set in Example 1, print pattern samples for color reproducibility evaluation were printed by use of the ink sets of Example 6 and Comparative Example 3. The print pattern samples contain patches having various hues.

In this case, the number of attachable ink cartridges is four in the ink-jet printer employed for the printing. Thus, upon printing the print pattern samples of the ink set of Example 6, the six inks were filled into respective ink cartridges, and these cartridges were divided into the following two groups for convenience. Subsequently, the printing was performed for each of the two groups.

First group: red ink 1, yellow ink, green ink and light cyan ink.

Second group: light cyan ink, blue ink, light magenta ink 1 and red ink 1.

In this ink division method, four out of the six inks were selected in the order of increasing hue angle to form the first group. The second group includes the ink having the largest hue angle among the first group inks, two inks having a hue angle larger than that of the first group inks and the ink having the smallest hue angle among the first group inks.

Further, a printer driver capable of printing the patch patterns having various hues was created to perform printing.

The obtained print pattern samples were measured for a* and b* as in above, and color reproduction areas were determined for L*=40, 50, 60, 70 and 80.

Figure 2:
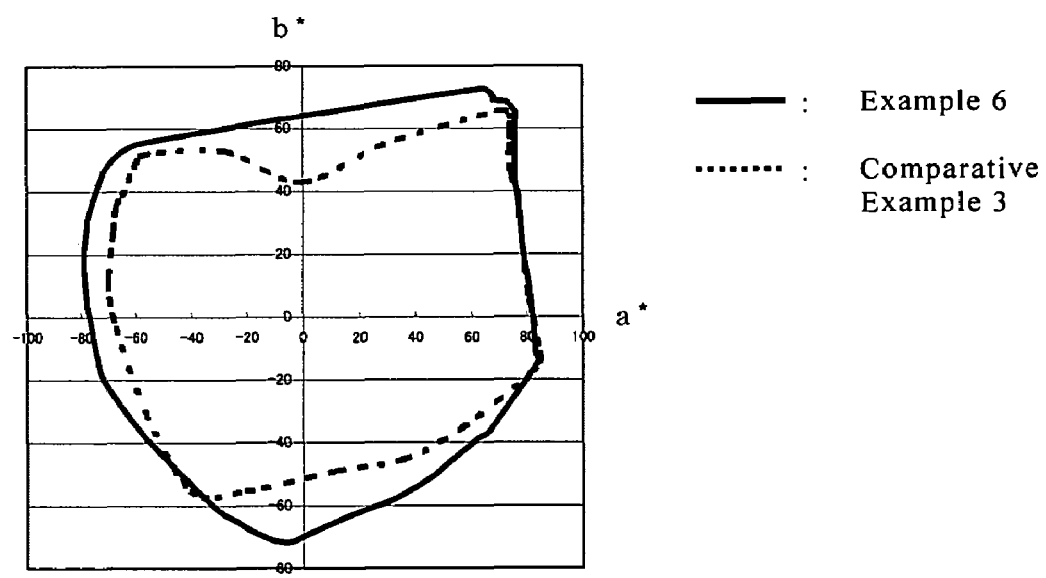
FIG. 2 is a graph showing the color reproduction range at lightness L*=50 for Example 6 and Comparative Example 3.
Figure 3:
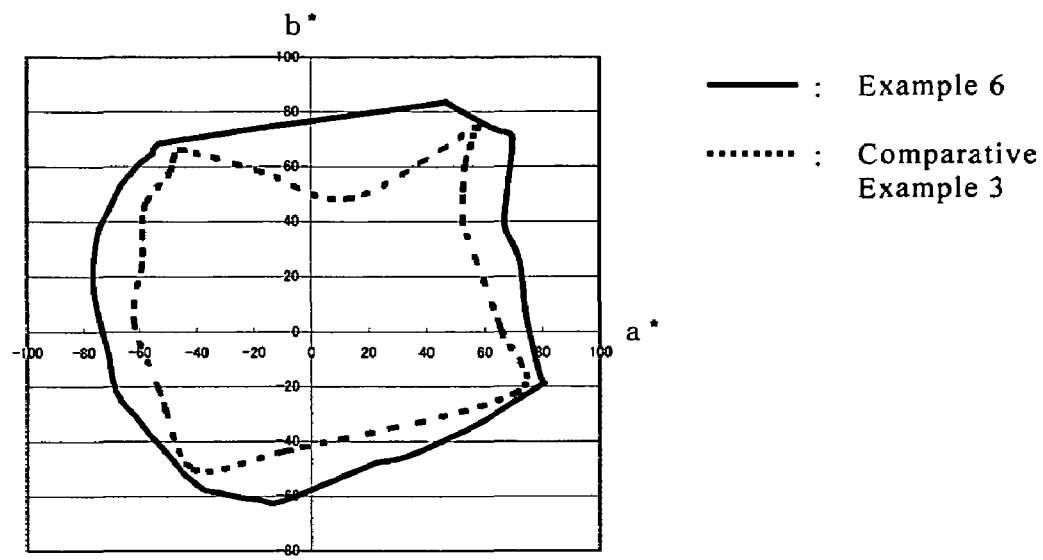
FIG. 3 is a graph showing the color reproduction range at lightness L*=60 for Example 6 and Comparative Example 3.
Figure 4:
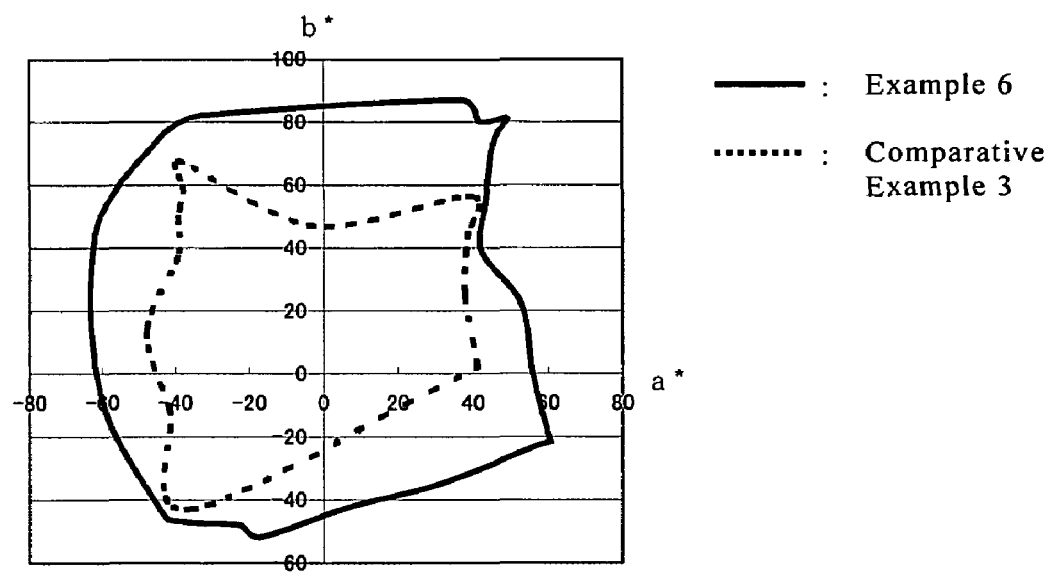
FIG. 4 is a graph showing the color reproduction range at lightness L*=70 for Example 6 and Comparative Example 3.
Figure 5:
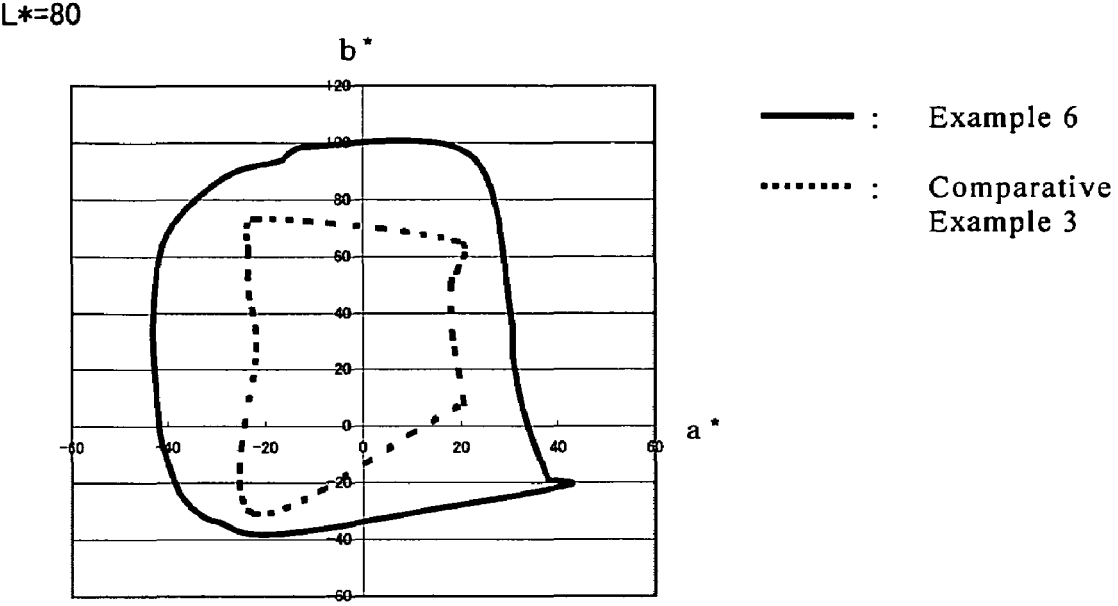
FIG. 5 is a graph showing the color reproduction range at lightness L*=80 for Example 6 and Comparative Example 3.

The ratio of the color reproduction area of Example 6 to that of Comparative Example 3 at the same L* value was determined, and the obtained results were evaluated according to the following criteria. The results are shown in Table 4. In addition, FIGS. 1 to 5 show the graphs of the color reproduction range of Example 6 and Comparative Example 3 for each L* value.

A: More than 110%.
B: More than 105% and 110% or less.
C: More than 90% and 105% or less.
D: 90% or less.

TABLE 4

|  |  | Example 6 | Comparative Example 3 |
|---|---|---|---|
| Ink set configuration | Yellow ink | Yellow ink | LC600Y |
|  | Magenta ink | Light magenta ink 1 | LC600M |
|  | Red ink | Red ink 1 | — |
|  | Cyan ink | Light cyan ink | LC600C |
|  | Blue ink | Blue ink | — |
|  | Green ink | Green ink | — |
| L* = 40 | Color reproduction area | 19078 | 12592 |
|  | Area ratio to Comp. Ex. | 151.5% | — |
|  | Evaluation | A | — |
| L* = 50 | Color reproduction area | 21805 | 19168 |
|  | Area ratio to Comp. Ex. | 113.8% | — |
|  | Evaluation | A | — |
| L* = 60 | Color reproduction area | 22910 | 16124 |
|  | Area ratio to Comp. Ex. | 142.1% | — |
|  | Evaluation | A | — |
| L* = 70 | Color reproduction area | 17004 | 8526 |
|  | Area ratio to Comp. Ex. | 199.4% | — |
|  | Evaluation | A | — |
| L* = 80 | Color reproduction area | 11873 | 5149 |
|  | Area ratio to Comp. Ex. | 230.6% | — |
|  | Evaluation | A | — |

As can be seen from the results in Table 4, the ink set of Example 6 has the color reproduction area significantly enlarged as compared to the ink set of Comparative Example 3.

The water-based ink set for ink-jet recording of the present invention enables the reduction of graininess in a low density printed part and the extension of a color reproduction range, and thus is useful when a color image is reproduced by a printer for ink-jet recording.

The entire disclosure of the specification, summary, claims and drawings of Japanese Patent Application No. 2004-370286 filed on Dec. 21, 2004 is hereby incorporated by reference.

What is claimed is:

1. A water-based ink set for ink-jet recording comprising a magenta ink and a red ink, wherein
the magenta ink is a light magenta ink having a lightness ($L^*$) of about 50 or more in the $L^*a^*b^*$ colorimetric system.

2. The water-based ink set for ink-jet recording according to claim 1, wherein
a normal magenta ink having a lightness ($L^*$) of less than about 50 in the $L^*a^*b^*$ colorimetric system is not included in the ink set.

3. The water-based ink set for ink-jet recording according to claim 1, wherein
the light magenta ink has the lightness ($L^*$) in a range of from about 50 to about 65 in the $L^*a^*b^*$ colorimetric system.

4. The water-based ink set for ink-jet recording according to claim 1, wherein
the light magenta ink has a hue angle (h) in a range of from about 335° to about 360° or in a range of from about 0° to about 5° in the $L^*a^*b^*$ colorimetric system.

5. The water-based ink set for ink-jet recording according to claim 1, wherein
the light magenta ink has a chroma ($C^*$) in a range of from about 80 to about 90 in the $L^*a^*b^*$ colorimetric system.

6. The water-based ink set for ink-jet recording according to claim 1, wherein
the red ink has a lightness ($L^*$) of about 50 or less in the $L^*a^*b^*$ colorimetric system.

7. The water-based ink set for ink-jet recording according to claim 1, wherein
the red ink has the lightness ($L^*$) in a range of from about 25 to about 50 in the $L^*a^*b^*$ colorimetric system.

8. The water-based ink set for ink-jet recording according to claim 1, wherein
the red ink has a hue angle (h) in a range of from about 20° to 35° in the $L^*a^*b^*$ colorimetric system.

9. The water-based ink set for ink-jet recording according to claim 1, wherein
the red ink has a chroma ($C^*$) in a range of from about 80 to about 90 in the $L^*a^*b^*$ colorimetric system.

10. The water-based ink set for ink-jet recording according to claim 1, further comprising a yellow ink and/or a cyan ink.

11. The water-based ink set for ink-jet recording according to claim 10, further comprising a blue ink and/or a green ink, and wherein
the cyan ink is a light cyan ink having a lightness ($L^*$) of about 60 or more in the $L^*a^*b^*$ colorimetric system.

12. The water-based ink set for ink-jet recording according to claim 11, wherein
a normal cyan ink having a lightness ($L^*$) of less than about 60 in the $L^*a^*b^*$ colorimetric system is not included in the ink set.

13. The water-based ink set for ink-jet recording according to claim 11, wherein
the light cyan ink has a lightness ($L^*$) in a range of from about 60 to about 85 in the $L^*a^*b^*$ colorimetric system.

14. The water-based ink set for ink-jet recording according to claim 11, wherein
the light cyan ink has a hue angle (h) in a range of from about 215° to about 255° in the $L^*a^*b^*$ colorimetric system.

15. The water-based ink set for ink-jet recording according to claim 11, wherein
the light cyan ink has a chroma ($C^*$) in a range of from about 40 to about 70 in the $L^*a^*b^*$ colorimetric system.

16. The water-based ink set for ink-jet recording according to claim 11, wherein
the blue ink has a lightness ($L^*$) of about 45 or less in the $L^*a^*b^*$ colorimetric system.

17. The water-based ink set for ink-jet recording according to claim 11, wherein
the blue ink has the lightness ($L^*$) in a range of from about 35 to about 45 in the $L^*a^*b^*$ colorimetric system.

18. The water-based ink set for ink-jet recording according to claim 11, wherein
the blue ink has a hue angle (h) in a range of from about 270° to about 285° in the $L^*a^*b^*$ colorimetric system.

19. The water-based ink set for ink-jet recording according to claim 11, wherein
the blue ink has a chroma ($C^*$) in a range of from about 70 to about 80 in the $L^*a^*b^*$ colorimetric system.

20. The water-based ink set for ink-jet recording according to claim 11, wherein
the green ink has a lightness ($L^*$) of about 60 or less in the $L^*a^*b^*$ colorimetric system.

21. The water-based ink set for ink-jet recording according to claim 11, wherein
the green ink has the lightness ($L^*$) in a range of from about 35 to about 60 in the $L^*a^*b^*$ colorimetric system.

22. The water-based ink set for ink-jet recording according to claim 11, wherein
the green ink has a hue angle (h) in a range of from about 175° to less than about 215° in the $L^*a^*b^*$ colorimetric system.

23. The water-based ink set for ink-jet recording according to claim 11, wherein
the green ink has a chroma ($C^*$) in a range of from about 60 to about 80 in the $L^*a^*b^*$ colorimetric system.

24. The water-based ink set for ink-jet recording according to claim 1, further comprising a black ink.

25. The water-based ink set for ink-jet recording according to claim 10, further comprising a black ink.

26. The water-based ink set for ink-jet recording according to claim 11, further comprising a black ink.

27. An ink-jet recording method employing the water-based ink set according to claim 1.

* * * * *